United States Patent

Ito

[11] Patent Number: 6,070,654
[45] Date of Patent: Jun. 6, 2000

[54] HEAT PIPE METHOD FOR MAKING THE SAME AND RADIATING STRUCTURE

[75] Inventor: Akira Ito, Ashiya, Japan

[73] Assignee: Nissho Iwai Corporation, Osaka, Japan

[21] Appl. No.: 09/157,374

[22] Filed: Sep. 21, 1998

[30] Foreign Application Priority Data

Apr. 3, 1998 [JP] Japan .................................. 10-091823

[51] Int. Cl.[7] ...................................................... F28F 7/00
[52] U.S. Cl. .............................. 165/104.26; 165/104.33; 361/700; 361/687; 257/715; 29/890.032
[58] Field of Search ............................. 165/104.33, 184, 165/104.26; 29/890.032; 361/700, 687, 697, 695; 257/715, 722, 721

[56] References Cited

U.S. PATENT DOCUMENTS

| | | | |
|---|---|---|---|
| 4,204,246 | 5/1980 | Ayi et al. ........................ | 165/104.26 X |
| 4,640,347 | 2/1987 | Grover et al. .................. | 165/104.26 X |
| 4,917,175 | 4/1990 | Sakayama et al. ............. | 165/104.26 X |
| 5,203,399 | 4/1993 | Koizumi ......................... | 165/104.33 |
| 5,409,055 | 4/1995 | Tanaka et al. .................. | 165/104.26 X |
| 5,588,483 | 12/1996 | Ishida ............................. | 165/104.33 X |
| 5,690,167 | 11/1997 | Rieger ............................ | 165/184 X |
| 5,712,762 | 1/1998 | Webb .............................. | 165/104.33 X |
| 5,729,995 | 3/1998 | Tajima ............................ | 165/104.33 X |
| 5,826,645 | 10/1998 | Meyers, IV et al. ............ | 165/104.33 |

*Primary Examiner*—Christopher Atkinson
*Attorney, Agent, or Firm*—Arent Fox Kintner Plotkin Kahn

[57] ABSTRACT

A heat pipe can be formed with a helical groove to allow easy bending, but the groove cannot be formed adequately deep. This allows the heat pipe to spring back during bending, thus making it difficult to use.

A heat pipe transfers heat using a working liquid sealed under decompression in a sealed tube. Helical ribs are formed from: a deep groove 12a cut radially and disposed on the outer perimeter surface of sealed pipe 10; and a thin groove 12b formed on the inner perimeter surface to generate capillary action. Deep groove 12 allows easy bending and ensures that deformation is maintained, while thin groove 12b provides capillary action to allow circulation of the working liquid in sealed pipe 10. To make the heat pipe, a shaft-shaped metal core 8 is formed with helical ribs 9 at a prescribed axial pitch on the perimeter surface. An outer cylinder 10a, which will form sealed tube 10, is fitted to the outside of shaft-shaped metal core 8. Sealed pipe 10 is made by rolling the perimeter surface of outer cylinder 10a along the cavities of metal core 8 to form helical ribs 12, including deep groove 12a and thin groove 12b, on outer cylinder 10a. The high-temperature section of the heat-radiating structure is thermally connected to a cooling fan via sealed pipe 10.

5 Claims, 4 Drawing Sheets

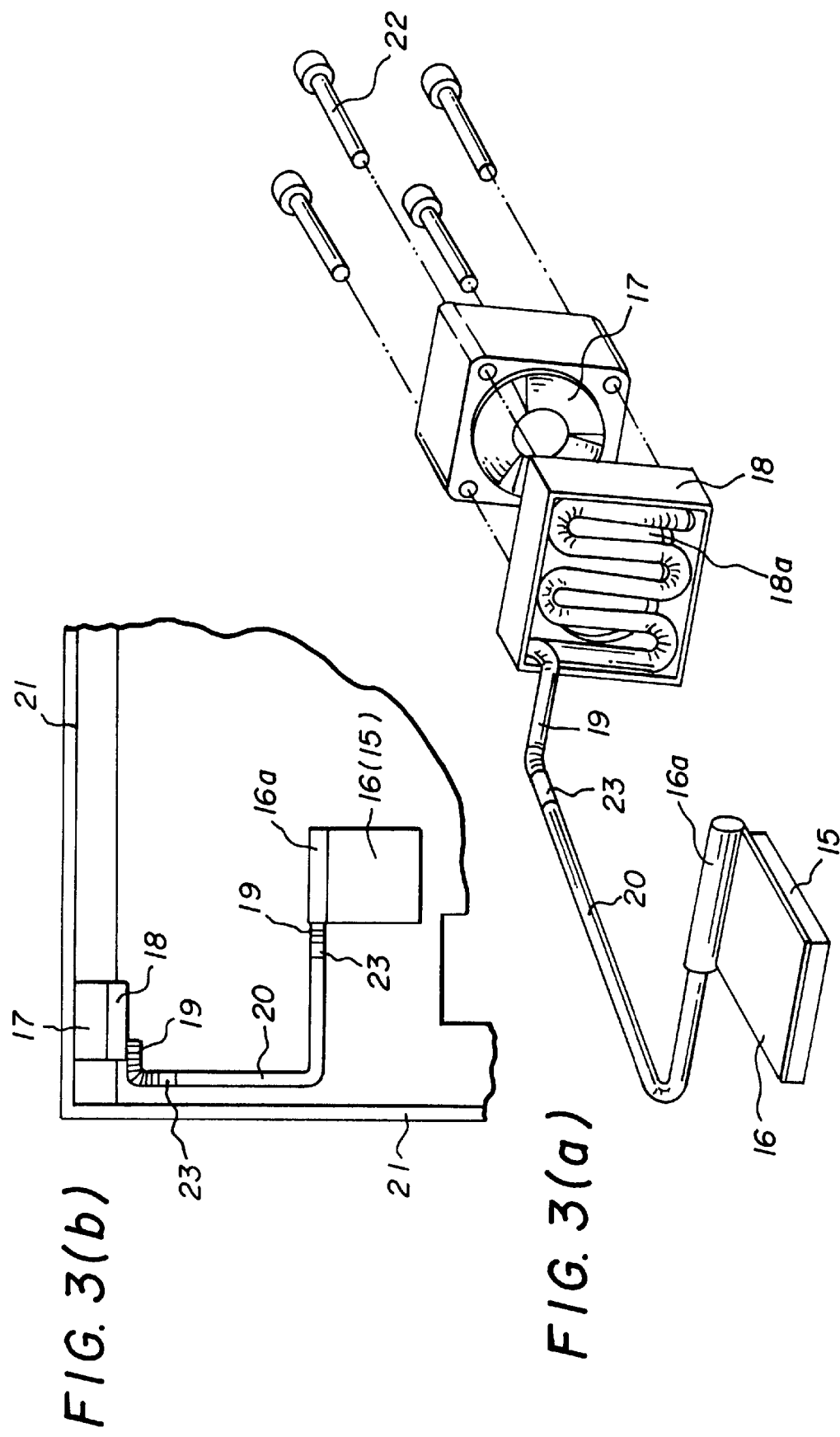

HEAT PIPE METHOD FOR MAKING THE SAME AND RADIATING STRUCTURE

FIELD OF THE INVENTION

The present invention relates to a heat pipe for transferring heat through a working liquid sealed in a sealed pipe. The present invention also relates to a method for making the same as well as a radiative structure that uses the same.

BACKGROUND OF THE INVENTION

In recent years, various types of heat pipes have been used due to their efficient heat transmission, their light weight and simple structure, and their quick responsiveness to heat. Referring to FIG. 4, there is shown one example.

Referring to FIG. 4 (a), a working liquid (2) is sealed under decompression in a rigid, sealed pipe (1) that is cylindrical in shape and has a diameter of less than a hundred millimeters. Working liquid (2) is evaporated at one end of sealed pipe (1), and the vapor is condensed at the other end. This allows a large amount of heat to be transferred even if there is only a slight temperature difference. The working liquid (2) that is liquefied at the condensation section is circulated back to the evaporation section by the capillary action of a wick (3). In place of wick (3), straight grooves can be formed on the inner wall surface of sealed pipe (1) so that the capillary action of the straight grooves can circulate working liquid (2).

Heat pipe (4) as described above is used in mechanical devices such as exhaust heat recovery devices and heat exchangers. The heat transfer properties can also be used in cancer thermotherapy and for cooling CPUs in notebook computers. Referring to FIG. 4 (b) and (c), there is shown an example of how the heat pipe can be used in CPU cooling. A heat pipe (4a) is extended from a CPU (6) and bent in the shape of an L, with the bent section being disposed near a hinge of a notebook computer 7. Another heat pipe (4b) bent in the shape of an L is disposed next to heat pipe (4a) near the hinge and they are fixed together by a metal sheet (5) wrapped around them. Heat pipe (4b) is extended along the back surface of a liquid crystal display panel (7a), and the heat generated by CPU (6) is transferred to the back surface of the panel and dissipated.

To simplify the bending of heat pipe (4), it would be possible to use a roller or the like to radially compress a coil wrapped around the outer perimeter surface of sealed pipe (1). Alternatively, a roller blade can be rolled along the outer perimeter surface of the sealed pipe so that a helical groove is formed on sealed pipe (1), thus making deformation easier.

Even if bending is made easier by a helical groove formed on heat pipe (4), the grooves cannot be formed adequately deep. Thus, the flexibility of heat pipe (4) is inadequate and the pipe can spring back during bending, making the operation difficult. Also, when heat pipe (4) is used for cooling the CPU of a notebook computer, two heat pipes (4a) and (4b) must be joined at the hinge section, thus decreasing the thermal efficiency. Furthermore, since heat pipe (4) is rigid, the bond between the heat pipes becomes worn when liquid crystal display panel (7a) is bent repeatedly, thus shortening the life span.

SUMMARY OF THE INVENTION

The object of the present invention is to provide a heat pipe that can be bent easily and that can maintain its shape when deformed, a method for making the same, and a radiating structure using the same.

In the heat pipe according to the present invention, a working liquid is sealed under decompression in a sealed pipe. Latent heat is transferred as the working liquid moves between the liquid phase and the gas phase, and this latent heat causes heat to be transferred from one end of the sealed pipe to the other end. The sealed pipe is formed with helical ribs, with deep grooves cut radially on the outer perimeter surface and thin grooves formed on the inner perimeter surface to generate capillary action In a method for making the same, an outer cylinder that will form the sealed pipe is fitted over a shaft-shaped core having on its perimeter surface helical ribs formed at a prescribed pitch in an axial direction. The perimeter surface of said outer cylinder is rolled along the cavities of the core. The rolled section and the areas between the rolled sections form deep grooves and thin grooves, respectively, thus forming helical ribs on the outer cylinder.

In a radiating structure, a high-temperature section in a computer is thermally connected to a heat-receiving end of a heat pipe having helical ribs at both ends. A heat-dissipating end at the other end is disposed near a ventilation opening of the side fame of the computer case. The heat generated by the high-temperature section in the computer is dissipated via the heat pipe to provide cooling.

According to the configurations described above, the deep grooves of the sealed tube allow easy bending and allow deformation to be maintained without immediate natural restoration. The capillary action from the thin grooves allows circulation of the working liquid. The helical ribs provide a significant increase in the surface area of the sealed pipe, thus providing efficient cooling and transfer of heat to the ventilation hole at the side frame of the computer case.

BRIEF DESCRIPTION OF THE DRAWINGS

For a fuller understanding of the nature and objects of the present invention, reference should be had to the following detailed description taken in connection with the accompanying drawings wherein:

FIGS. 1 (d) and (e) are, respectively, a side-view drawing and a partial cross-sectional front-view drawing of a step for rolling using rollers in a method for making heat pipes according to the present invention.

FIG. 2 (b) is a partial cross-sectional front-view drawing showing a sealed pipe according to the present invention that has been axially compressed and on which are formed deep grooves and thin grooves.

FIG. 2 (c) is a side-view drawing showing a step for finishing the outer cylinder in a method for making heat pipes according to the present invention.

FIG. 3 (a) is a perspective drawing of a heat-receiving section and a heat-dissipating section of an embodiment of the heat-dissipating structure used in a heat pipe according to the present invention.

FIG. 3 (b) is a partial plan drawing showing a computer heat-dissipation structure using a heat pipe according to the present invention.

FIG. 4 (b) is a perspective drawing showing a heat-dissipating heat pipe connected to a CPU in a notebook computer.

FIG. 4 (c) is a perspective drawing showing a notebook computer in which is installed a heat pipe for CPU cooling.

DETAILED DESCRIPTION OF THE PREFERRED EMBODIMENTS

Figure 1A:
FIGS. 1 (a), (b) and (c) are front-view drawings showing respectively a step for wrapping a coil around a core, a step for adjusting the coil pitch and a step for fitting an outer cylinder which will later form a sealed pipe.
Figure 1B:
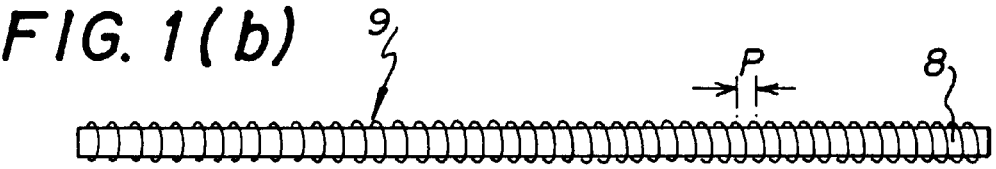
Figure 1C:
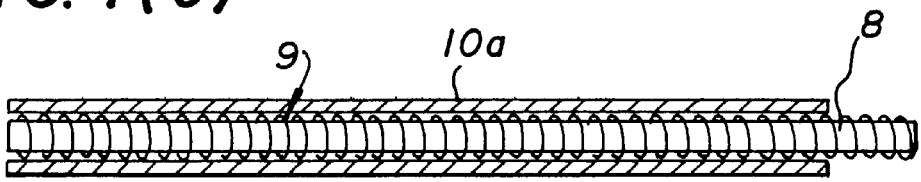
Figure 1D:
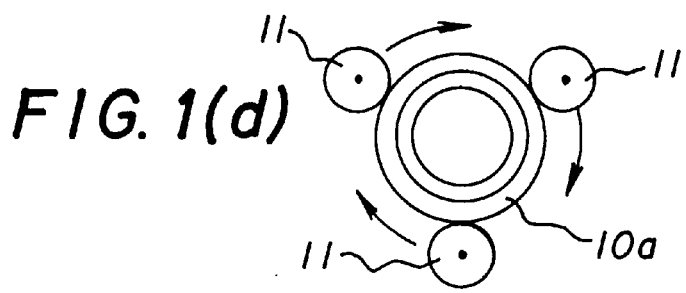
Figure 1E:
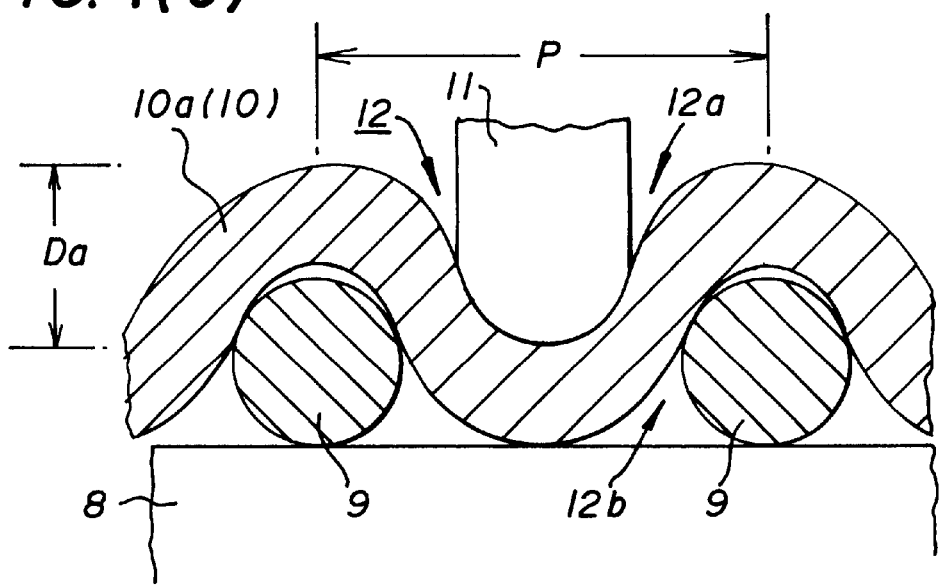
Figure 2A:
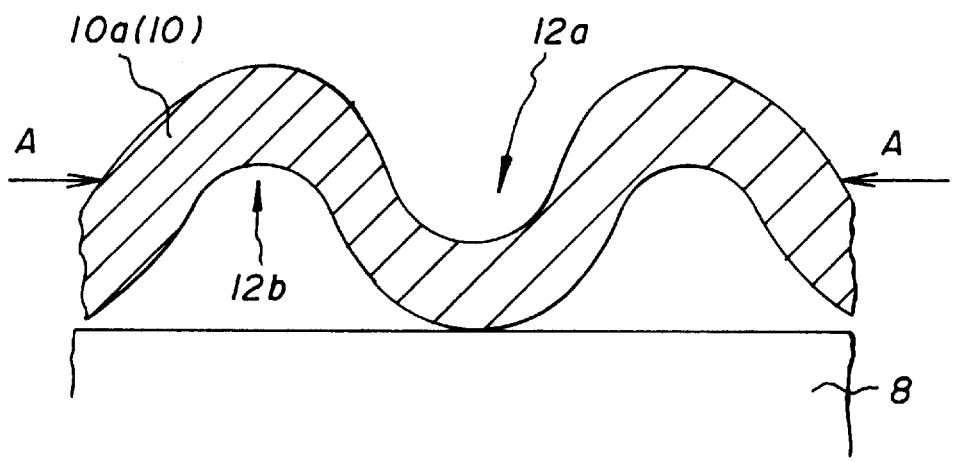
FIG. 2 (a) is a partial cross-sectional front-view drawing showing a step for compressing the rolled outer cylinder along its axis in a method for making heat pipes according to the present invention.
Figure 2B:
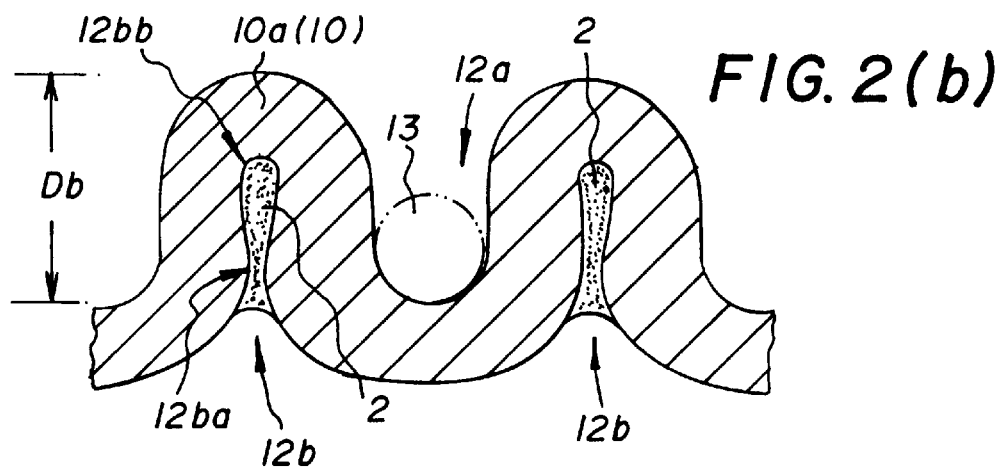
Figure 2C:
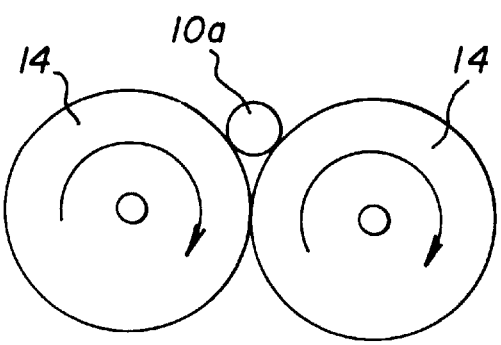
Figure 4A:
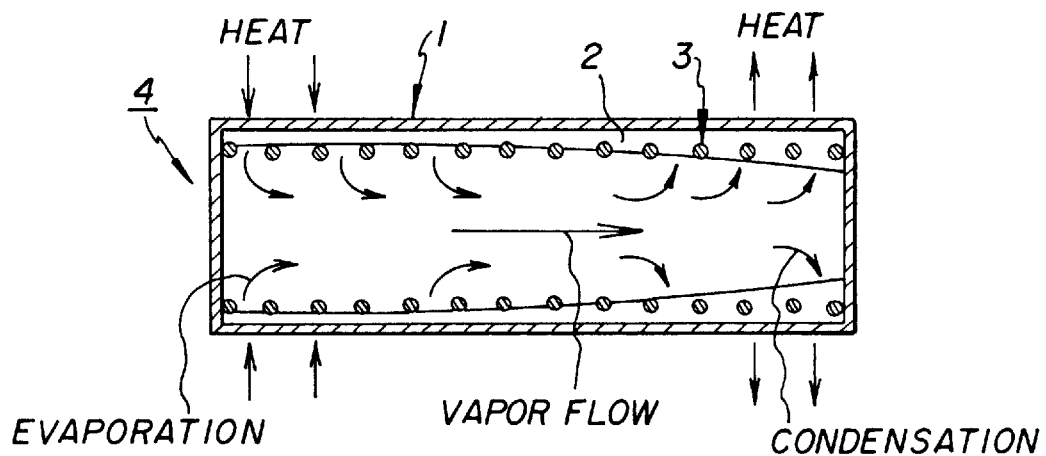
FIG. 4 (a) is a vertical cross-sectional drawing showing an example of a conventional heat pipe.
Figure 4B:
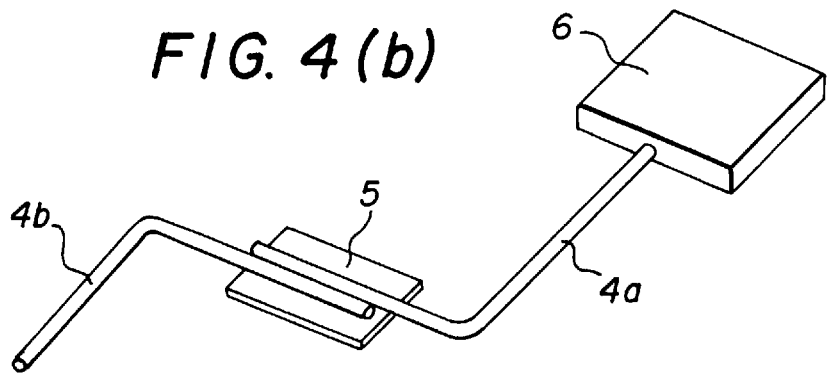
Figure 4C:
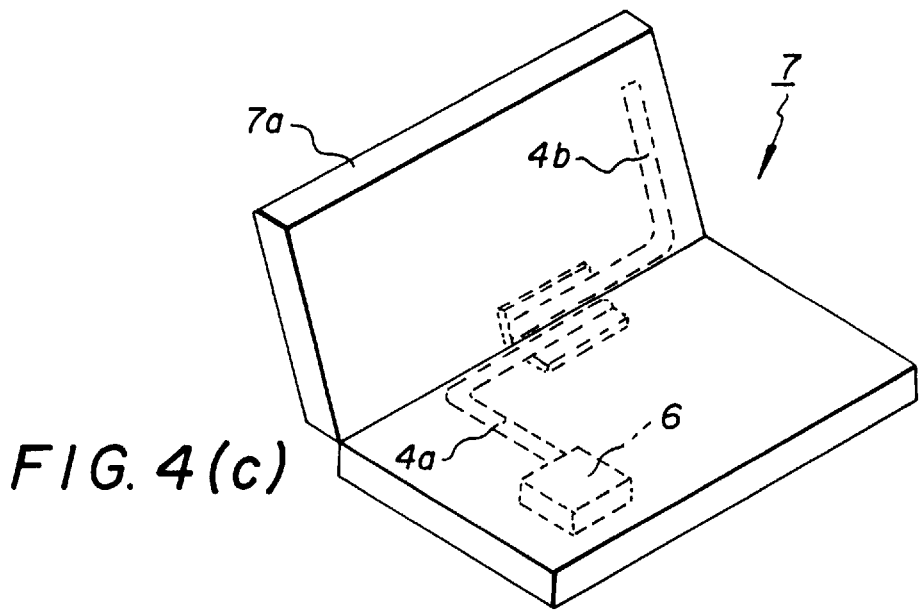

Referring to FIG. 1 through FIG. 3, the following is a description of the heat pipe and the method for making the same and the radiative structure according to the present invention. The heat pipe according to the present invention is as shown in FIG. 4 (a) but is also formed with helical ribs having deep radial grooves formed on the outer perimeter surface and thin grooves formed on the inner perimeter surface to generate capillary action. The sealed pipe can be bent easily due to the deep grooves and maintains its shape without springing back immediately after deformation. The capillary action due to the thin grooves circulates the working fluid.

Referring to FIG. 1 (a), the groove structures described above are formed by coiling a thin wire (9) around a cylindrical core (8). Referring to FIG. 1 (b), coil (9) is then drawn axially to a prescribed length to adjust a coil pitch (P). Referring to FIG. 1 (c), a metal outer cylinder (10a) that will form sealed pipe (10) is fitted over the outside of core (8) and coil (9). The ends of core (8) and coil (9) are partially exposed from outer cylinder (10a). Depending on the corrosive strength of working liquid (2) shown in FIG. 4 (a), copper, silver, stainless steel, brass, and the like can be used selectively in appropriate amounts to form the metal used in outer cylinder (10a). For example, if working liquid (2) is water, copper or silver would be desirable. Other examples of working liquid (2) include alcohol, ammonia, high-temperature naphthalene, and low-temperature liquid nitrogen. In these cases, stainless steel, brass, or the like would be used selectively.

Next, while visually keeping track of coil pitch (P) from the exposed sections described above, rolling is performed on the perimeter surface of outer cylinder (10a) in a spiral shape along the spaces between the coils. The rolling can be done, for example, as shown in FIG. 1 (d) where three rollers (11), (11), (11) are disposed along the perimeter surface at 120 degree intervals with ⅓ pitch axial offsets. Rollers (11), (11), (11) are rolled so that they follow the same space between coils, moving in a spiral shape along the perimeter surface of outer cylinder (10a).

Referring to FIG. 1 (e), the space between coils is deformed around coil (9), which had been wrapped beforehand. This forms a helical rib (12) on the perimeter surface of outer cylinder (10a) around the coils. Helical rib (12) includes deep grooves (12a), cut radially on the outer perimeter surface, and thin grooves (12b), formed on the inner perimeter surface and generating a capillary force.

Core (8) and then coil (9) are removed. Referring to FIG. 2 (a), core (8) is then reinserted into outer cylinder (10a) and the outer cylinder (10a) is compressed to a prescribed length in the axial direction indicated by an arrow (a). Referring to FIG. 2 (b), this causes a depth (Db) of deep grooves (12a) to become greater than a depth (Da) before compression, forming deep grooves (12a) extended radially. Thin grooves (12b) also become thinner. Core (8) is then removed again. Referring to FIG. 2 (b), a thin wire (13) is coiled along deep grooves (12a). Referring to FIG. 2 (c), outer cylinder (10a) is mounted on a pair of rollers (14) (14) which are rotated in the same direction so that rolling is performed radially on outer cylinder (10a). This provides finishing for outer cylinder (10a), resulting in a sealed pipe (10).

Sealed pipe (10) formed in this way can be easily bent due to deep grooves (12a) and can maintain its shape without springing back. Referring to FIG. 2 (b), entries (12ba) of thin groove (12b) is formed narrow, while inward sections (12bb) are formed wider. Capillary action causes a large amount of working liquid (2) to enter thin grooves (12b), thus maintaining a return path for working liquid (2). According to measurements, in a heat pipe according to the present invention that is 10 mm long and has a diameter of 3 mm, thin grooves (12b) hold 0.026 g of working liquid (2). In a conventional heat pipe having the same length and diameter, this amount would be 0.004 g. Thus, according to the present invention, more than roughly six times the working liquid (2) can be contained in thin grooves (12b) compared to the conventional technology, thus greatly improving heat transfer.

Referring to FIGS. 3 (a) and (b), the following is a description of a computer cooling structure using a heat pipe according to the present invention. Referring to FIG. 3 (a), there is shown a CPU (15), a heat sink (16), a cooling fan (17), a heat dissipation frame (18), a heat pipe (19) according to the present invention, and a heat pipe (20) according to the conventional technology (a sealed pipe without ribs). CPU (15) is installed in the computer and generates heat internally, making it a heat source. Heat sink (16) is an aluminum plate covering the heat generating surface of CPU (15). One end of heat sink (16) is wrapped cylindrically to form an attachment pipe (16a) for heat pipe (19), described later. In place of attachment pipe (16a), it would also be possible to form a coiled attachment groove on the flat surface of heat sink (16).

Referring to FIG. 3 (b), cooling fan (17) is disposed near a ventilation hole of a computer case side frame (21). Heat dissipation frame (18) is screwed to cooling fan (17) at the four corners via fastening screws (22). A circular opening (18a) is formed toward the fan (the side from which heat is dissipated). Heat pipes (19) are connected in a thermally integral manner to the ends of conventional heat pipe (20) via joining pipes (23) to form a heat receiving end and a heat dissipation end. The heat receiving end is inserted into attachment pipe (16a) of, heat sink (16) to receive the heat from CPU (15). As described above, helical ribs (12) according to the present invention are formed on sealed heat pipe (19). This makes bending easier and maintains shape after deformation. Thus, the heat dissipating end can be bent multiple times to form a meandering shape to be placed in heat dissipation frame (18), which is then cooled with fan (17). It would also be possible to coil the heat-receiving end and to attach it to the coiled attachment groove formed on heat sink (16) in place of attachment pipe (16a). Also, the heat-receiving end can be thermally connected to parts beside the CPU that act as heat sources.

Referring to FIG. 3 (b), according to the heat dissipation structure described above, the heat generated by CPU (15) is received by heat sink (16) and transferred to the heat-receiving end of heat pipe (19) in attachment pipe (16a). Since helical ribs (12) are formed on sealed heat pipe (19), the heat-receiving surface area is significantly increased, thus improving the heat transfer efficiency. The heat is then transferred from the heat-receiving end through heat pipe (20) and to the heat-dissipating end in heat-dissipation frame (18), where it is cooled by fan (17).

As described with the heat-receiving end, sealed heat pipe (19) is formed with helical ribs (12) and is bent multiple times. This dramatically increases the heat dissipation area and significantly improves heat dissipation efficiency. For example, when the method of the present invention is used on a 210 mm long flat sealed tube with a diameter of 3 mm, a sealed pipe 160 mm long and having a 3 mm diameter is formed. This sealed pipe has the same heat dissipation are (measured at 1979.208 mm^2) as a conventional sealed pipe that is 210 mm long.

When a heat pipe according to the present invention is used in notebook computers to dissipate heat from the CPU, the absence of a "spring-back" effect makes it easier to use and allows a single heat pipe to be bent as necessary to allow passage though the hinge. The heat pipe can then be extended directly to the back surface of the liquid crystal display panel. Thus, the need to join two heat pipes is eliminated and the thermal efficiency is greatly improved. The absence of wear at the joints also improves life span significantly.

The present invention is not restricted to the embodiments described above, and can also involve a method where, for example, instead of using coil (9), helical ribs are formed directly on core (8) at a prescribed pitch along the axis. Outer cylinder (10a) is then fitted over core (8) to form ribs. Core (8) is withdrawn along the helical structure via a cork-screw rotation. Also, the heat dissipation end extending from the heat receiving end of heat pipe (19) and over heat pipe (20) can be directly exposed to the outside atmosphere for cooling.

ADVANTAGES OF THE INVENTION

According to the present invention, a heat pipe includes a working liquid sealed under decompression in a sealed pipe. The working liquid changes between gas and liquid phases, and the latent heat transferred at these phase changes causes heat to be transferred from one end to the other. The heat pipe is formed with helical ribs. The helical ribs include: deep grooves formed on the outer perimeter surface of the heat pipe and extending parallel to the radial direction; and thin grooves formed on the inner perimeter surface of the heat pipe and generating capillary action. The deep grooves allow easy bending and allow deformation to be maintained without natural restoration. The thin grooves provide capillary action that allows the working liquid to be circulated. Thus, when the heat pipe is bent, the deformed shape is maintained without natural restoration, thus making the heat pipe easier to use. When the heat pipe is used in a heat dissipation structure, the surface areas for receiving and dissipating heat increase dramatically, thus improving heat dissipation efficiency significantly.

What is claimed is:

1. A heat pipe, comprising a sealed pipe containing therein a working liquid which is sealed under pressure and which changes between a liquid phase and a gas phase to transfer latent heat from one end of the sealed pipe to the other end of the sealed pipe, the sealed pipe having a helical shape composed of a first set of alternating ribs and grooves on an outer perimeter surface of the sealed pipe and a second set of alternating ribs and grooves on an inner perimeter surface of the sealed pipe, wherein the ribs on the outer perimeter surface and the ribs on the inner perimeter surface are made of a wall of the sealed pipe and are formed by bending the wall, the grooves on the outer perimeter surface have a wider opening than the grooves on the inner perimeter surface, and are configured to allow the sealed pipe to maintain any deformation caused upon the sealed pipe, and the grooves on the inner perimeter surface are configured to produce capillary action to draw the working liquid thereinto.

2. A method of making a heat pipe according to claim 1, the method comprising (a) providing a shaft-shaped core having helical ribs on an outer perimeter surface thereof formed at a predetermined pitch in an axial direction;

(b) fitting an outer cylinder around the structure of step (a);

(c) rolling an outer perimeter surface of the outer cylinder along cavities between the helical ribs to form alternating ribs and grooves in the outer cylinder.

3. The method of making a heat pipe according to claim 2, further comprising before step (a), coiling a wire around the shaft-shaped core at a predetermined pitch;

after step (c), removing the shaft-shaped core and thereafter the wire from the surrounding outer cylinder;

thereafter, reinserting the shaft-shaped core into the outer cylinder;

thereafter, axially compressing the outer cylinder to a predetermined length to make a first set of grooves on the outer perimeter surface of the outer cylinder and a second set of grooves on an inner perimeter surface of the outer cylinder, wherein the first set of grooves is wider than the second set of grooves; and thereafter removing the shaft-shaped core, coiling a wire around the first set of grooves, and radially rolling the outer cylinder.

4. A computer case containing a radiating structure comprising a high-temperature section of a computer and the heat pipe of claim 1, wherein the heat pipe has a heat-receiving end and a heat-dissipating end, the high-temperature section of the computer is in thermal communication with the heat-receiving end and the heat-dissipating end is disposed adjacent a ventilation opening in the computer case, wherein the heat pipe is configured to dissipate heat generated by the high-temperature section of the computer via the ventilation opening.

5. A computer case containing a radiating structure comprising a heat-receiving plate which covers a heat-generating surface of a high-temperature section of a computer, a heat-dissipating fan which is disposed adjacent a ventilation opening in the computer case, a heat-dissipating frame which is disposed adjacent the heat-dissipating fan, and the heat pipe of claim 1, wherein the heat pipe has a heat-receiving end and a heat-dissipating end, the heat-receiving plate is in thermal communication with the heat-receiving end, and the heat-dissipating end is multiply bent and densely disposed in the heat-dissipating frame, wherein the heat pipe is configured to dissipate heat generated by the high-temperature section of the computer via the heat-dissipating frame and the heat-dissipating fan.

* * * * *

UNITED STATES PATENT AND TRADEMARK OFFICE
CERTIFICATE OF CORRECTION

PATENT NO. : 6,070,654
DATED : June 6, 2000
INVENTOR(S) : Akira ITO

It is certified that error appears in the above-identified patent and that said Letters Patent is hereby corrected as shown below:

On the title page, item [73], delete in its entirety.

Signed and Sealed this

Nineteenth Day of December, 2000

Attest:

Q. TODD DICKINSON

*Attesting Officer*     *Commissioner of Patents and Trademarks*